United States Patent [19]

Fujita et al.

[11] Patent Number: 5,113,062
[45] Date of Patent: May 12, 1992

[54] MAGNETIC CARD HAVING THERMAL RECORDING LAYER AND ARRANGEMENT OF MAGNETIC BARS FOR RECORDING SECURITY INFORMATION

[75] Inventors: Minoru Fujita; Yoshihiko Nakahara, both of Tokyo, Japan

[73] Assignee: Kyodo Printing Co., Ltd., Tokyo, Japan

[21] Appl. No.: 613,768

[22] PCT Filed: Mar. 29, 1990

[86] PCT No.: PCT/JP90/00420
§ 371 Date: Dec. 4, 1990
§ 102(e) Date: Dec. 4, 1990

[87] PCT Pub. No.: WO90/13114
PCT Pub. Date: Nov. 1, 1990

[30] Foreign Application Priority Data

Apr. 26, 1989 [JP] Japan ............................ 1-104514

[51] Int. Cl.$^5$ .......................... G06K 19/06; B05D 5/12; B42D 15/00
[52] U.S. Cl. ........................ 235/493; 235/494; 427/131; 283/904
[58] Field of Search ........... 235/488, 493, 490, 487; 283/85, 94, 904; 360/131; 427/127, 131

[56] References Cited

U.S. PATENT DOCUMENTS

| | | | |
|---|---|---|---|
| 3,790,754 | 2/1974 | Black et al. | 235/493 |
| 4,044,231 | 8/1977 | Beck et al. | 235/488 |
| 4,132,350 | 1/1979 | Kubota et al. | 235/493 |
| 4,315,145 | 2/1982 | Nishikawa et al. | 235/493 |
| 4,849,618 | 7/1989 | Namikawa et al. | 235/490 |

FOREIGN PATENT DOCUMENTS

| | | | |
|---|---|---|---|
| 53-104203 | 9/1978 | Japan | 427/131 |
| 58-043079 | 3/1983 | Japan | 235/493 |
| 58-150133 | 9/1983 | Japan | 235/493 |
| 1-059911 | 4/1989 | Japan . | |

*Primary Examiner*—Stuart S. Levy
*Assistant Examiner*—Edward H. Sikorski
*Attorney, Agent, or Firm*—Baker & Daniels

[57] ABSTRACT

A magnetic card wherein visible patterns are written. A magnetic recording layer is formed on a substrate, a sensitizing layer is formed on the magnetic recording layer, a metallic thin layer is formed on the sensitizing layer, a protective layer is formed on the metallic thin layer, an arrangement of magnetic bars is formed on the protective layer at one region of the magnetic card, and at least one information track is formed on the magnetic recording layer at the other region of the magnetic card. The metallic thin layer and the sensitizing layer are configured such that, upon the application of heat by a localized source, the heated portions of the metallic thin layer are dispersed into the sensitizing layer to produce the visible patterns.

7 Claims, 5 Drawing Sheets

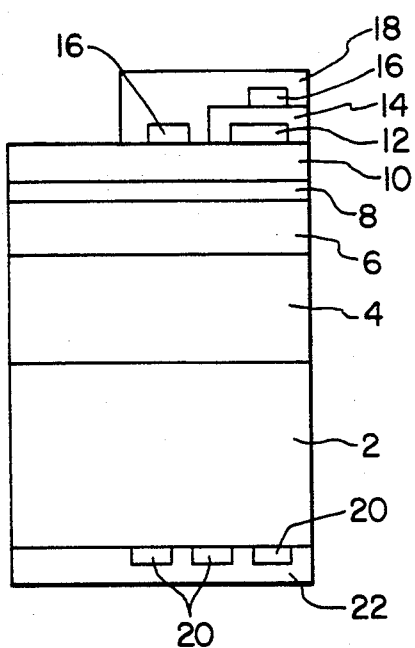
FIG. A
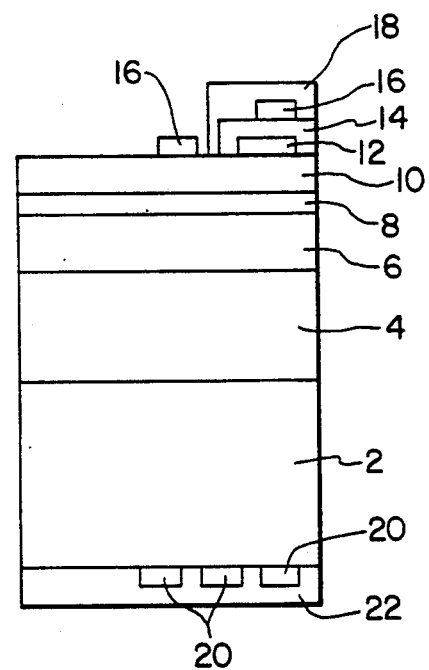
FIG. B

MAGNETIC CARD HAVING THERMAL RECORDING LAYER AND ARRANGEMENT OF MAGNETIC BARS FOR RECORDING SECURITY INFORMATION

TECHNICAL FIELD

This invention relates to a magnetic card and more particularly, to a magnetic card wherein visible patterns or visible information can be written, and where the security of magnetic recording is improved.

The invention can be effectively applied to pre-paid cards such as a telephone card wherein numerals corresponding to the contents of magnetic recording are printed.

TECHNICAL BACKGROUND

Magnetic cards are handy to carry and are widely used. The magnetic card has a magnetic recording layer formed on a desired region of the surface of a substrate having an appropriate thickness.

Magnetically recorded information such as a record of use and a balance account (remainder), etc. cannot be seen in the magnetic card and therefore, the remainder was roughly indicated by punched holes and the like in the pre-paid magnetic card. However, since the precise remainder is not indicated, cash or another pre-paid magnetic card must be supplied when the remainder is insufficient. In order to avoid such a situation, it is required to print the record of use, the remainder and the like.

Conventionally, printing is generally performed on the surface of a magnetic card opposite to the magnetic recording layer by a wire dot printing head through a pressure sensitive ribbon, by a thermal printing head through a heat sensitive ink ribbon or by a thermal printing head to a heat sensitive recording layer formed on the card surface. However, a desired design is generally formed on the surface of the magnetic card opposite to the magnetic recording layer and a wide area for the above printing is not desirable in terms of the above design.

Conventionally, printing is performed on the side of the magnetic recording layer of the magnetic card in some cases and in such cases the magnetic recording layer is partially formed on the substrate in one area of the card and printing is performed on the other area. Therefore, it is impossible to make both the magnetic recording area and the printing area sufficiently large.

Recently, a larger amount of information is being recorded in the magnetic cards and therefore, it is preferable that the magnetic recording area be large and the printing area be as large as possible.

On the other hand, there has arisen a problem of wrongful use of the magnetic card, such as forgery, alteration and the like, and therefore, it is important to improve the security of the magnetic card.

DISCLOSURE OF THE INVENTION

Accordingly, it is an object of this invention to provide a magnetic card wherein visible patterns (information) such as letters, marks and figures can be written as superposed on a magnetic recording layer and security is improved.

According to this invention, the above object are achieved by a magnetic card wherein visible patterns can be written, in which a magnetic recording layer is formed on a substrate, a sensitizing layer is formed on the magnetic recording layer, a metallic thin layer is formed on the sensitizing layer, a protective layer is formed on the metallic thin layer, an arrangement of magnetic bars is formed on the protective layer at one region of the magnetic card, and at least one information track is formed in the magnetic recording layer at the other region of the magnetic card, the sensitizing layer being for improving the writing characteristics by receiving fine particles of material of the metallic thin layer formed by heating.

According to this invention, the above object are also achieved by a magnetic card wherein visible patterns can be written, in which a magnetic recording layer is formed on a substrate, an arrangement of magnetic bars is formed on the magnetic recording layer at one region of the magnetic card, a sensitizing layer is formed on the magnetic recording layer and magnetic bars, a metallic thin layer is formed on the sensitizing layer, a protective layer is formed on the metallic thin layer, and at least one information track is formed in the magnetic recording layer at the other region of the magnetic card, the sensitizing layer being for improving the writing characteristics by receiving fine particles of material of the metallic thin layer formed by heating.

In the present invention, the arrangement of magnetic bars may be covered by a covering layer and may bear security information which is also recorded in the information track in the magnetic recording layer.

In the present invention, at least one non-magnetic dummy bar having a similar shape as the magnetic bar may be arranged in combination with the arrangement of the magnetic bars.

FIG. A is a schematic cross-sectional view showing an essential part of a magnetic card of the present invention.

FIG. B is a schematic cross-sectional view showing an essential part of a magnetic card of the present invention.

BEST MODE FOR CARRYING OUT THE INVENTION

FIGS. 1 to 6 are, respectively, schematic sectional views of essential parts of magnetic cards according to the invention.

Figure 1:
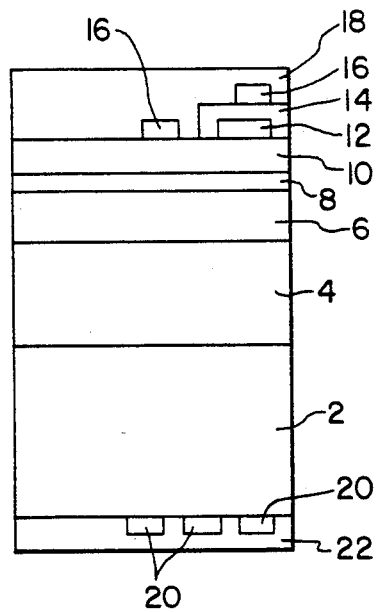
FIG. 1 is a schematic cross-sectional view showing an essential part of a magnetic card of the present invention.
Figure 2:
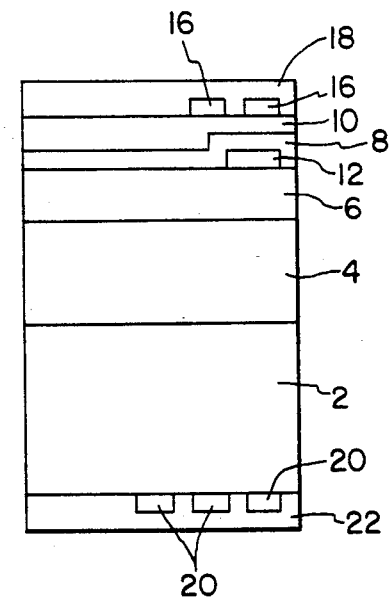
FIG. 2 is a schematic cross-sectional view showing an essential part of a magnetic card of the present invention.
Figure 3:
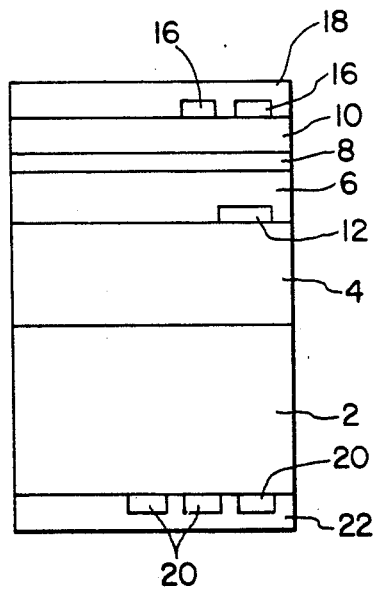
FIG. 3 is a schematic cross-sectional view showing an essential part of a magnetic card of the present invention.
Figure 4:
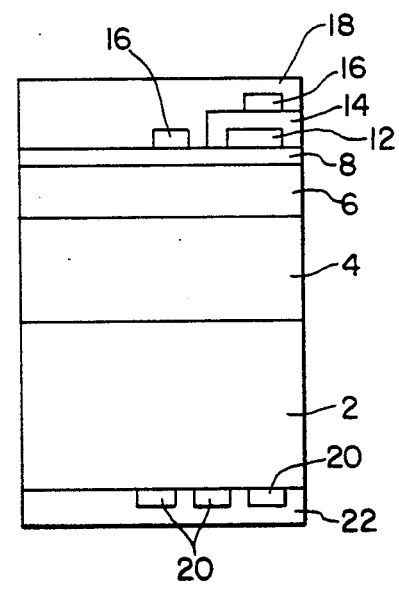
FIG. 4 is a schematic cross-sectional view showing an essential part of a magnetic card of the present invention.

In FIG. 1, a magnetic recording layer 4 is formed on an upper surface of a substrate layer 2, and an undercoat layer 6 is formed on the magnetic recording layer. A metal thin film layer 8 is formed on the undercoat layer, and a first protective layer 10 is formed on the metal thin film layer. A magnetic bar 12 constituting a magnetic bar code is formed on the first protective layer, and a covering layer 14 is formed on the magnetic bar. Print layers 16 are formed on the first protective layer 10 and the covering layer 14. A second protective layer 18 is formed on the first protective layer 10 and the covering layer 14 to cover the print layers 16 therewith. At the lower side of the substrate layer 2 is formed print layers 20, which is covered with a third protective layer 22 at the lower side of the substrate layer 2.

The card substrate layer 2 may be a sheet made of synthetic resins such as polyethylene terephthalate, epoxy resins, polyvinyl chloride, polycarbonates and the like, synthetic papers, and the like. The thickness of the substrate layer 2 is, for example, approximately 100–300 μm.

The magnetic recording layer 4 may be any magnetic recording layers ordinarily used in this type of magnetic recording medium. For instance, magnetic materials are Ba-ferrites, Sr-ferrites, Co-coated $\gamma$-Fe$_2$O$_3$, $\gamma$-Fe$_2$O$_3$, needle-like iron powder, CrO$_2$ and the like in the form of a powder having a size of not larger than 10 μm, preferably 0.01–5 μm. Binders are ordinarily employed polyester resins, alkyd resins, vinyl resins, polyurethane resins or mixtures thereof. The mixing ratio of the binder to the magnetic material is appropriately set in consideration of the adhesion to the substrate layer 2, the film strength and the detection voltage of a magnetic head, and is, for example, in the range of 1/1–1/10, preferably ½–⅛, on the weight basis. The thickness of the magnetic recording layer 4 is, for example, approximately 5–20 μm.

The undercoat layer 6 is provided to improve (sensitizing action) writing characteristics of the metal thin film layer 8, to improve the adhesion to the metal thin film layer 8, and to cause the background of the metal thin film layer 8 to assume a color as white as possible for easy visual observation. Materials for this include self-oxidative resins such as nitro cellulose resins, and thermoplastic resins such as acrylic resins, polyester resins, vinyl chloride resins, vinyl acetate resins, polystyrene resins, polybutyral resins and the like. The thickness of the undercoat layer 6 is, for example, approximately 0.5–8 μm.

The metal thin film layer 8 is used to cover the magnetic recording layer 4 and also used as a writing film. The materials for constituting the metal thin film layer include, for example, low melting metals such as Sn, Bi, Se, Te, Zn, In, Pb-Sn and the like. The thickness of the metal thin film layer is, for example, approximately 0.03–0.2 μm.

The first protective layer 10, the second protective layer 18 and the third protective layer 22 are those known as a protective layer in this type of magnetic recording medium. Materials for this include, for example, cellulose resins, urethane resins, polyester resins, vinyl resins, epoxy resins, acrylic resins and the like. These resins may contain plasticizers such as phthalic esters, aliphatic esters, phosphoric esters and the like. In order to impart lubricity, oleyl amides, stearyl amides, silicones and the like may be added. It will be noted that to reduce the amount of a solvent used, UV-curable resins or electron beam-curable resins may be used. As the UV curable resins, there may be utilized acrylic, epoxy and polyester resins. It will be noted that as the first protective layer 10, thermoplastic resins are preferably used for improving (sensitizing action) of writing characteristics of the metal thin film layer 8. The thickness of the protective layers 10, 18 and 22 is, for example, approximately 0.5–5 μm.

The first protective layer 10 should preferably be made of a low melting material which has good compatibility with the undercoat layer 6 when melted and good adhesion to the metal thin film layer 8, the magnetic bar 12, the covering layer 14 and the second protective layer 18, and wherein it does not prevent melting of the metal thin film layer 8.

The materials for the magnetic bar 12 constituting the magnetic bar code may be similar to those of the magnetic recording layer 4. It is to be noted that the magnetic bar 12 may have magnetic characteristics (e.g. carbonyl iron powder) different from those of the magnetic recording layer 4. In addition, a non-magnetic dummy bar having a similar shape as the magnetic bar 12 may be used in combination. The magnetic bar 12 and the dummy bar have, for example, a thickness of approximately 0.5–12 μm.

The covering layer 14 is formed to visually cover the magnetic bar 12 and the dummy bar, and the materials therefor include thermosetting resins, for example, such as polyamide resins, epoxy resins, acrylic resins, phenolic resins, unsaturated polyester resins, polyurethane resins, diallyl phthalate resins, alkyd resins and the like. In order to impart covering properties, pigments including, for example, powders of metal such as Al, Sn, Pb, Zn, Cu, Ag, Cu-Zn and the like and powders of metal oxides such as $AlO_2$, $TiO_2$ and the like may be added in appropriate amounts. The thickness of the covering layer 14 is, for example, 0.5-3 μm.

The print layers 16, 20 are ordinary print layers of a desired design and have, for example, a thickness of 0.5-5 μm. The print layer 16 may be one which exhibits a desired display in cooperation with the visual pattern formed in the metal thin film layer 8.

In FIGS. 2-6, like members in FIG. 1 indicate like reference numerals.

In the embodiments of FIGS. 1-6, it is preferred that in order that good magnetic recording and reproducing characteristics are attained, the total thickness of the layers above the magnetic recording layer 4 in the region where the magnetic bar 12 and the dummy bar 12' are not formed is not larger than 10 μm.

FIGS. 7(a)-(f) are views illustrating a procedure of fabricating the magnetic card according to the embodiment of FIG. 1. The fabrication is described based on these figures.

Figure 7B:
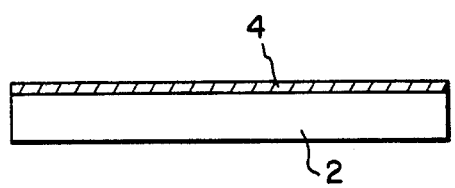
FIG. 7(b) is a perspective view showing a step of a fabrication process of the magnetic card shown in FIG. 1.
Figure 7C:
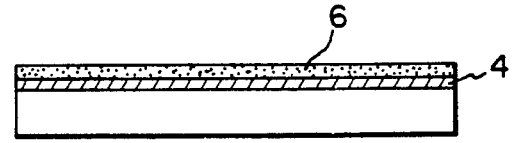
FIG. 7(c) is a perspective view showing a step of a fabrication process of the magnetic card shown in FIG. 1.
Figure 5:
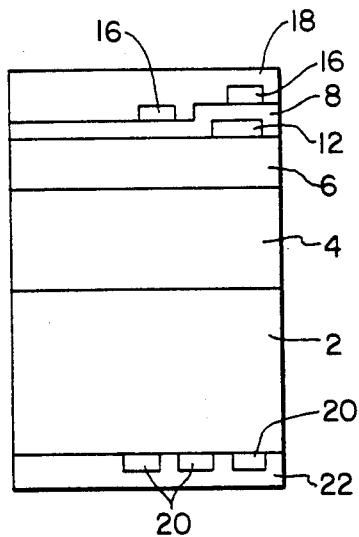
FIG. 5 is a schematic cross-sectional view showing an essential part of a magnetic card of the present invention.
Figure 6:
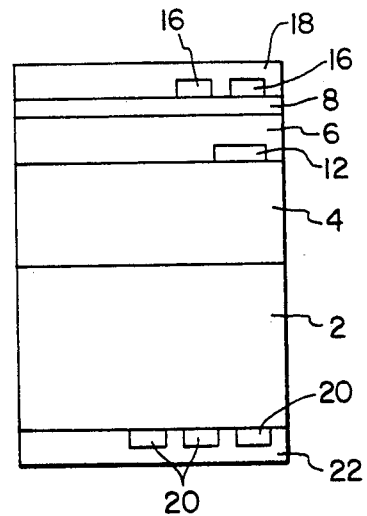
FIG. 6 is a schematic cross-sectional view showing an essential part of a magnetic card of the present invention.
Figure 7A:
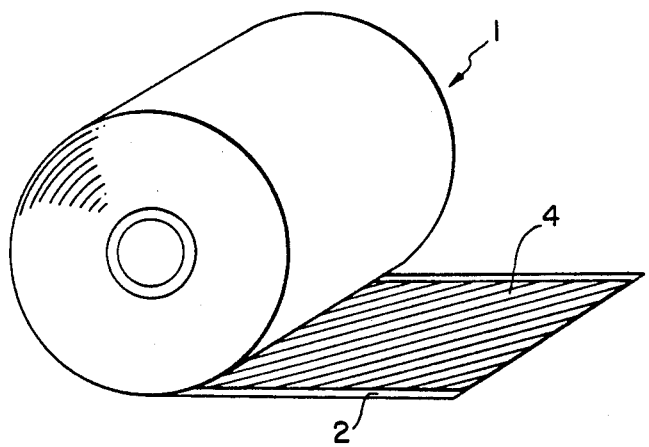
FIG. 7(a) is a perspective view showing a step of a fabrication process of the magnetic card shown in FIG. 1.

As shown in FIG. 7(a), a roll 1 of magnetic sheet (410 mm in width, 400 m in length) was first provided wherein a magnetic recording layer 4 made of a Ba ferrite magnetic material and having a thickness of 10 μm, a coercive force of 2750 Oe, a residual magnetic flux of 1.4 Mx/cm and a squareness ratio of 0.85 was formed on one side of a 188 μm thick white polyethylene terephthalate film 2 [E-24, available from Toray Industries Inc.]. FIG. 7(b) shows a partial section of the roll.

As shown in FIG. 7(c), a 3 μm thick undercoat layer 6 was formed on the magnetic recording layer 4. For the formation of the undercoat layer, a paint comprising

| | |
|---|---|
| vinyl chloride acetate copolymer [Vinylite resin VMCH, available from Union Carbide Corp.] | 20 parts by weight |
| melamine-formaldehyde condensate [Epostar S-12, available from Nippon Shokubai Kagaku Kogyo Co., Ltd.] | 5 parts by weight |
| methyl ethyl ketone | 20 parts by weight |
| toluene | 20 parts by weight |
| cyclohexanone | 40 parts by weight | was prepared, to which

| | |
|---|---|
| isocyanate curing agent [Coronate L, available from Nippon Polyurethane Ind. Co., Ltd.] | 1.2 parts by weight | was added, followed by coating by the use of a reverse roller coater and drying at 110° for 5 minutes.

The melamine formaldehyde condensate was used as fine particles in order to roughen the surface of the undercoat layer 6. When the undercoat layer was roughened, a metal thin film layer 8 would become readily roughened when the metal thin film layer was subsequently formed. The diffuse reflection from the metal thin film layer became large with a uniform white color, thus providing a good contrast with the magnetic recording layer 4 to ensure good visual observation of a visible pattern. The fine particles used to roughen the surface may be, aside from the above, polyimide resin powders, low molecular weight ethylene tetrafluoride resin powders, calcium stearate, tin stearate, polystyrene latices, bentonite, wollastonite, talc, aluminum silicate, sericite, silica, kaolin clay, white carbon, calcium carbonate, chalk, calcium hydroxide, dolomite powder, magnesium carbonate, barium sulfate and the like. The fine particles are formulated in an amount of not larger than 50 parts by weight, preferably not larger than 25 parts by weight, per 100 parts by weight of the resin.

Figure 7D:
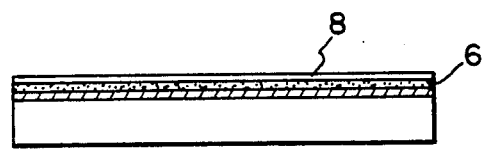
FIG. 7(d) is a perspective view showing a step of a fabrication process of the magnetic card shown in FIG. 1.

Next, as shown in FIG. 7(d), while the sheet was passed at a rate of 20 m/minute, a Sn thin film layer 8 was formed on the undercoat layer 6 by a vacuum deposition method using a reduced pressure of $1 \times 10^{-4}$ Torr. The Sn thin film layer was poor in metallic luster and assumed a color close to a white color.

Figure 7E:
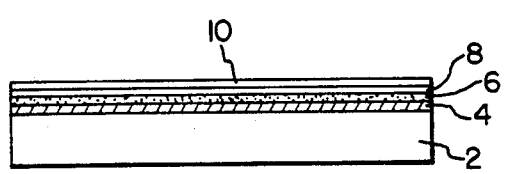
FIG. 7(e) is a perspective view showing a step of a fabrication process of the magnetic card shown in FIG. 1.

As shown in FIG. 7(e), a 1 μm thick first protective layer 10 was formed on the Sn thin film layer 8. For the formation of the protective layer, a paint with the following composition was prepared

| | |
|---|---|
| polyvinyl butyral resin [S-LEC B BM-S, available from Sekisui Chemical Co., Ltd.] | 5 parts by weight |
| vinyl chloride acetate copolymer [Vinylite resin VAGH, available from Union Carbide Corp.] | 5 parts by weight |
| toluene | 45 parts by weight |
| cellosolve acetate | 45 parts by weight |
| To the paint was added | |
| isocyanate curing agent [Coronate L, available from Nippon Polyurethane Ind. Co., Ltd.] | 0.25 parts by weight. | followed by coating by the use of a gravure coater and drying at 110° for 5 minutes.

Next, the sheet was cut into pieces having 580 mm length, followed by printing.

Figure 7F:
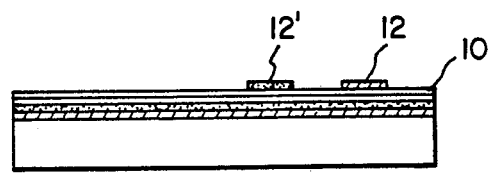
FIG. 7(f) is a perspective view showing a step of a fabrication process of the magnetic card shown in FIG. 1.

As shown in FIG. 7(f), a magnetic bar 12 constituting a magnetic bar code and having a thickness of 8 μm, a width of 1 mm and a length of 5 mm and a dummy bar 12' having a thickness of 7 μm, a width of 1 mm and a length of 5 mm were formed on the first protective layer 10 by a #250 silk screen printing method.

For the formation of the magnetic bar 12, there was used a paint which was obtained by kneading and uniformly dispersing the following composition in one hour by means of a roll mill

| | |
|---|---|
| carbonyl iron powder [available from BASF AG, average size of 1.7 μm and a coercive force of 8.8 Oe] | 50 parts by weight |
| alkyd resin | 10 parts by weight |
| cyclohexanone | 20 parts by weight |
| solvesso 100 | 20 parts by weight |

Similar characteristic results are obtained using, instead of the above carbonyl iron powder, single crystal iron powder [Atomiron, available from Showa Denko K.K., average size of 2.5 μm].

For the formation of the dummy bar 12', there was used a paint which was obtained by kneading and uniformly dispersing the following composition in one hour by means of a roller mill

| | |
|---|---|
| red oxide ($\alpha$-$Fe_2O_3$) | 20 parts by weight |
| carbon black | 5 parts by weight |
| titanium white ($TiO_2$) | 15 parts by weight |
| alkyd resin | 20 parts by weight |
| cyclohexanone | 20 parts by weight |
| solvesso 100 | 20 parts by weight |

Figure 7G:
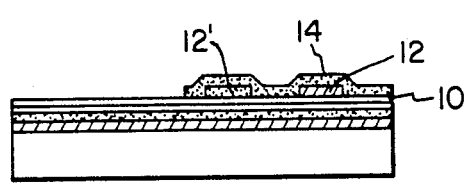
FIG. 7(g) is a perspective view showing a step of a fabrication process of the magnetic card shown in FIG. 1.

As shown in FIG. 7(g), a 1 μm thick covering layer 14 was formed partially on the first protective layer 10 in order to cover the magnetic bar 12 and the dummy bar 12'. For the formation of covering layer, a paint having the following composition was prepared, applied by #300 silk screen printing and dried at 80° C. for 20 minutes

| | |
|---|---|
| aluminium paste (solid content of 60%) | 3 parts by weight |
| alkyd resin | 10 parts by weight |
| cellosolve acetate | 10 parts by weight |
| xylene | 10 parts by weight |

Figure 7H:
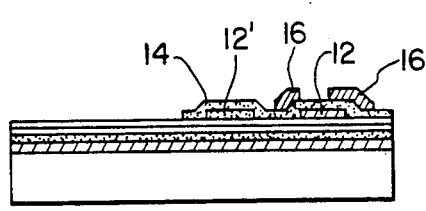
FIG. 7(h) is a perspective view showing a step of a fabrication process of the magnetic card shown in FIG. 1.

As shown in FIG. 7(h), a UV curable black ink was used to form a 1 μm thick print layer 16 on the covering layer 14. The print layer indicates instructions.

Figure 7I:
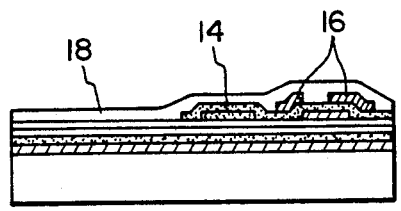
FIG. 7(i) is a perspective view showing a step of a fabrication process of the magnetic card shown in FIG. 1.

Next, as shown in FIG. 7(i), a 2 μm thick second protective layer 18 was formed on the first protective layer 10 to cover the covering layer 14 and the print layer 16. The formation of the second protective layer was effected by subjecting UV anchor No. 7 [available from Toka Sikiso Chemical Ind. Co., Ltd.] to UV offset printing in a thickness of 1 μm and further UVOP varnish DK [available from Toka Sikiso Chemical Ind. Co., Ltd.] to UV offset printing in a thickness of 1 μm.

Figure 7J:
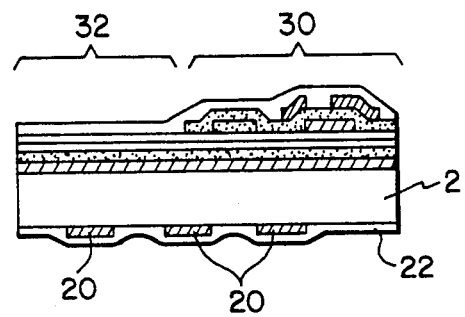
FIG. 7(j) is a perspective view showing a step of a fabrication process of the magnetic card shown in FIG. 1.

Subsequently, as shown in FIG. 7(j), a 2 μm thick desired color print layer 20 and a 2 μm thick third protective layer 22 were formed on the back side of the substrate layer 2. These layers were formed by an ordinary UV offset printing method.

Finally, the sheet was punched in a desired shape to obtain a magnetic card.

Figure 8:
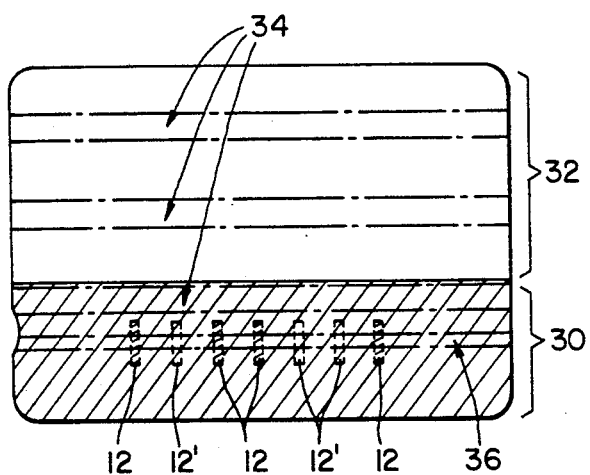
FIG. 8 is a plan view of the magnetic card of the present invention.

FIG. 8 shows a plan view of the thus obtained magnetic card.

30 indicates a region where the covering layer 14 for the magnetic bar 12 and the dummy bar 12' are formed. 32 indicates a region where the covering layer 14 is not formed. In this region, a visible pattern can be formed by thermal recording. These two regions are also shown in FIG. 7(j).

In FIG. 8, 34 indicates a first information track for recording information in the magnetic recording layer 4. The track is present in the regions 30 and 32. 36 indicates a second information track for reproducing the magnetic bar code information.

Figure 9:
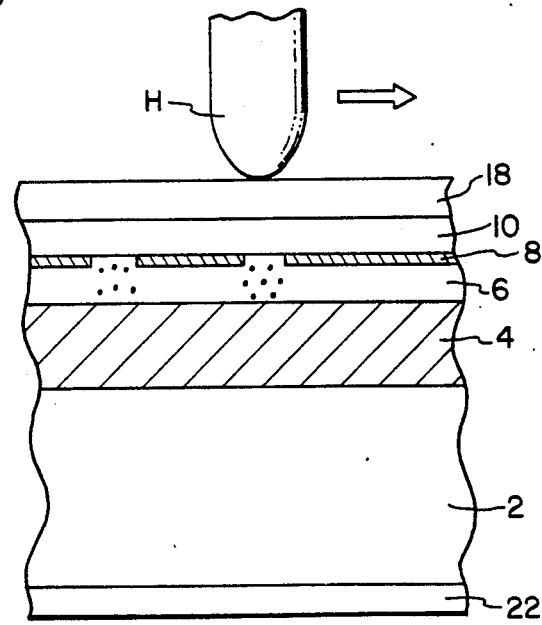
FIG. 9 is a schematic cross-sectional view illustrating a method for writing visible patterns in the magnetic card of the present invention.

FIG. 9 is a schematic sectional view for illustrating a method for writing a visible pattern in the magnetic card.

As shown, when a thermal head H is contacted with the second protective layer 18 to scan in the direction of the arrow and heat is generated from heating elements of the head H at an appropriate time, the undercoat layer 6 and the metal thin film layer 8 are melted by the heat, whereupon the metal thin film layer 8 is so thin that it is dispersed in the undercoat layer in the form of fine particles by the action of the surface tension (part of the particles is dispersed in the first protective layer 10). At the portion where the material of the metal thin film layer has been dispersed, the metal thin film stands broken. After passage of the head H, the undercoat layer 6 is solidified in this state to fix the record. The portion which does not suffer any heat from the head is left in the form of the metal thin film layer 8, assuming a white color. On the other hand, the portion heated by the head assumes a blackish color of the magnetic recording layer 4. Thus, a visible pattern with a good contrast is formed. It will be noted that since fine particles of the metal is dispersed in the undercoat layer 6 at portions where the metal thin film layer 8 has been broken, their amount is so small that the visual observation of the magnetic recording layer 4 is not impeded.

A visible pattern was formed in the magnetic card obtained in the above example under the following conditions.

Thermal head—Thermal head for a printing simulator [KE1502-11, available from Rohm Co., Ltd., resistance of 424 Ω].

Applied voltage pulse—16 V, 0.55 W/dot, duty ratio of 50%, 132 KHz.

Magnetic card transfer speed—22 mm/second.

After the formation of the visible pattern, the reflective density was measured by the use of a Macbeth densitometer RD 918, revealing that the density of the patterned portion was 0.95 and that of the non-patterned portion was 0.25 with a good contrast.

The measurement of the density was repeated except that the visible pattern was formed under conditions of an applied voltage pulse frequency of 100 KHz and a magnetic card transfer speed of 17 mm/second, with the result that the reflection density of the patterned portion was 0.98 and that of the non-patterned portion was 0.25 with a good contrast.

Instead of the thermal head, an appropriate means capable of supplying a similar amount of heat and breaking the metal layer, e.g. a laser marker, may be used.

The visible pattern writing as stated above may be effectively applied to printing of the record of use of the card (date and the amount paid) and a balance account. More particularly, whenever a magnetic card is used, the balance account recorded in the magnetic recording layer 4 is changed. The detail is thermally printed in the card by which the user invariably knows the content of the card.

In the magnetic card of this embodiment, information such as of the type of card, a record of use and a balance account is recorded in the information track 34 of the magnetic recording layer 4 and the magnetic information in the information track can be recorded and reproduced by an ordinary method.

With the magnetic card of this embodiment, fixed information inherent to the magnetic card, e.g. the type of card, is recorded in the magnetic bar code, and its reproduction is made by scanning with the magnetic head to which a DC bias current is applied.

Figure 10:
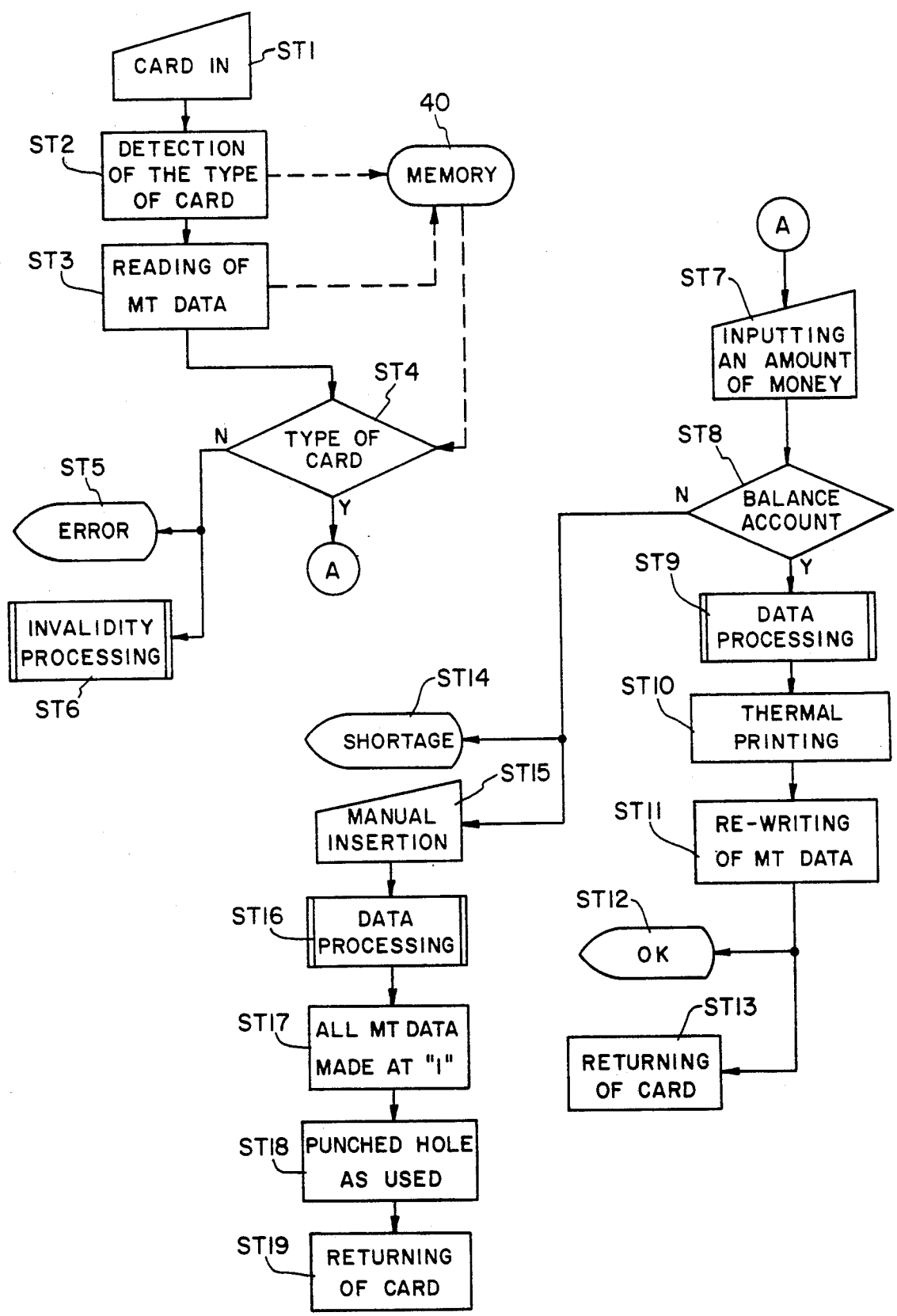
FIG. 10 is a flow chart showing an example of operations of reader-writer for the magnetic card of the present invention.

FIG. 10 shows a flow chart illustrating on example of the operation of a reader writer using the magnetic card of the embodiment.

When a card holder inserts the card into the reader writer (ST1), the magnetic bar code at the information track 36 is read out to detect the type of card (ST2). The detected data is memorized in a memory 40.

The magnetic recording information (MT data) in the information track 34 is read out (ST3) and memorized in the memory 40.

Subsequently, the card type data in the memory and the information of the card type in the MT data are compared with each other (ST4). If both data are not coincident with each other by the comparison, the card is not recognized as a correct one, so that an error display (ST5) is made and an invalidity processing is effected (ST6).

If the data are coincident with each other by the comparison in ST4 and the card is regarded as a correct one, an input necessary for an amount paid (e.g. a fare)

becomes possible and the amount of money is inputted (ST7).

Thereafter, the inputted amount and the balance account in the MT data (balance) are compared with each other (ST8), whereupon when the balance is larger, a necessary data processing, i.e. a processing wherein the money paid is reduced from the balance account (ST9).

The record of use of the card (date and an amount of money paid) and the detail of the balance account after the reduction are printed in the metal thin film layer 8 by means of the thermal head in the same manner as described above (ST10).

The overall data after the data processing is recorded in the information track 34 (ST11). At this time, rewriting is effected such that previous data is erased and the overall data is freshly recorded. By this, in case where the magnetic recording layer 4 is influenced by the thermal printing to change the information, accurate information can be recorded.

Next, it is displayed that the dealing is completed (ST12) to return the card (ST13).

If the balance account is in shortage in ST8, such is displayed (ST14), requesting the shortage in the account. When an amount of money corresponding to the shortage is inserted (ST15), a necessary data processing is performed (ST16), e.g. all the data are made at "1" and recorded in the information track 34 (ST17), followed by punching a hole, as used, in the card (ST18) and returning (ST19).

FIGS. A and B are schematic cross sectional views of separate embodiments showing an essential part of a magnetic card of the present invention.

INDUSTRIAL UTILIZATION

As described hereinabove in detail, according to the invention, visible patterns such as letters, marks and figures can be written as superposed on the magnetic recording layer, so that both a magnetic recording region and a visible pattern-writing region can be made satisfactorily great. Since the magnetic bar code and the contents of record in the magnetic recording layer are compared, security is ensured.

We claim:

1. A magnetic card wherein visible patterns are written, in which a magnetic recording layer is formed on a substrate, a sensitizing layer is formed on the magnetic recording layer, a metallic thin layer is formed on the sensitizing layer, a protective layer is formed on the metallic thin layer, an arrangement of magnetic bars is formed on the protective layer at one region of the magnetic card, and at least one information track is formed in the magnetic recording layer at the other region of the magnetic card, the metallic thin layer and the sensitizing layer being configured such that, upon application of heat by a localized source, the heated portions of the metallic thin layer are dispersed into the sensitizing layer to produce the visible patterns.

2. The magnetic card as defined in claim 1, wherein said arrangement of magnetic bars is covered by a covering layer.

3. The magnetic card as defined in claim 1, wherein said arrangement of magnetic bars bears security information which is also recorded in the information track in the magnetic recording layer.

4. The magnetic card as defined in claim 1, wherein at least one non-magnetic dummy bar having a similar shape as one of said magnetic bars is arranged in combination with the arrangement of magnetic bars.

5. A magnetic card wherein visible patterns are written, in which a magnetic recording layer is formed on a substrate, an arrangement of magnetic bars is formed on the magnetic recording layer at one region of the magnetic card, a sensitizing layer is formed on the magnetic recording layer and magnetic bars, a metallic thin layer is formed on the sensitizing layer, a protective layer is formed on the metallic thin layer, and at least one information track is formed in the magnetic recording layer at the other region of the magnetic card, the metallic thin layer and the sensitizing layer being configured such that, upon application of heat by a localized source, the heated portions of the metallic thin layer are dispersed into the sensitizing layer to produce the visible patterns.

6. The magnetic card as defined in claim 5, wherein said arrangement of magnetic bars bears a security information which is also recorded in the information track in the magnetic recording layer.

7. The magnetic card as defined in claim 5, wherein at least one non-magnetic dummy bar having a similar shape as one of said magnetic bars is arranged in combination with the arrangement of magnetic bars.

* * * * *